United States Patent
Kim et al.

(10) Patent No.: US 10,890,103 B2
(45) Date of Patent: *Jan. 12, 2021

(54) CONTROL METHOD OF COOLING SYSTEM FOR VEHICLE

(71) Applicants: Hyundai Motor Company, Seoul (KR); Kia Motors Corporation, Seoul (KR)

(72) Inventors: Han Sang Kim, Gyeonggi-do (KR); Seong Sik Kim, Gyeonggi-do (KR); Dongho Lee, Gyeonggi-do (KR); Sun Gyu Park, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 157 days.

This patent is subject to a terminal disclaimer.

(21) Appl. No.: 16/166,986

(22) Filed: Oct. 22, 2018

(65) Prior Publication Data

US 2020/0040805 A1 Feb. 6, 2020

(30) Foreign Application Priority Data

Aug. 1, 2018 (KR) .......................... 10-2018-0089817

(51) Int. Cl.
*G05D 23/00* (2006.01)
*F01P 7/16* (2006.01)
(Continued)

(52) U.S. Cl.
CPC .............. *F01P 7/167* (2013.01); *F02M 26/24* (2016.02); *F02M 26/28* (2016.02); *F02M 26/30* (2016.02);
(Continued)

(58) Field of Classification Search
CPC .... F01P 7/167; F01P 2007/146; F02M 26/24; F02M 26/28; F02M 26/30; F02M 26/32; F02M 26/33
(Continued)

(56) References Cited

U.S. PATENT DOCUMENTS 6,668,764 B1 * 12/2003 Henderson .............. F01P 7/167
123/41.1
10,513,963 B2 * 12/2019 Koguchi ................... F01P 7/16
(Continued)

FOREIGN PATENT DOCUMENTS

| JP | 4571897 B2 | 10/2010 |
| JP | 2016-138513 A | 8/2016 |
| KR | 10-2008-0027683 A | 3/2008 |

OTHER PUBLICATIONS

JinYong Kim et al., "The Next Generation 1.6L Naturally Aspirated Gasoline Engine from Hyundai-Kia", 26th Aachen Colloquium Automobile and Engine Technology 2017, Oct. 11, 2017.

*Primary Examiner* — Claire E Rojohn, III
(74) *Attorney, Agent, or Firm* — Mintz Levin Cohn Ferris Glovsky and Popeo, P.C.; Peter F. Corless

(57) ABSTRACT

A method for controlling a vehicle cooling system is provided. The system includes an engine, an EGR cooler, an oil cooler, a heater, a radiator, and a controller. The engine, the EGR cooler, the oil cooler, the heater, and the radiator are respectively connected through a coolant line and coolant circulates through the engine, the EGR cooler, the oil cooler, the heater, and the radiator by operation of a water pump. The controller receives the coolant from the engine and operates a control valve that is connected with the oil cooler, the heater, and the radiator. The method includes sensing driving conditions and operating the control valve when a warm mode is required to increase the temperature within the vehicle based on the sensed driving conditions. The (Continued)

control valve is operated based on first to third modes depending on a coolant temperature.

17 Claims, 5 Drawing Sheets

(51) Int. Cl.
    *F02M 26/32*     (2016.01)
    *F02M 26/30*     (2016.01)
    *F02M 26/24*     (2016.01)
    *F02M 26/28*     (2016.01)
    *F02M 26/33*     (2016.01)
    *F01P 7/14*     (2006.01)

(52) U.S. Cl.
    CPC ............ *F02M 26/32* (2016.02); *F02M 26/33* (2016.02); *F01P 2007/146* (2013.01)

(58) Field of Classification Search
    USPC ........................................................ 165/300
    See application file for complete search history.

(56) References Cited

U.S. PATENT DOCUMENTS

| | | | | |
|---|---|---|---|---|
| 10,576,817 | B2* | 3/2020 | Battaglini | B62D 61/065 |
| 2001/0010210 | A1* | 8/2001 | Chamot | G05D 23/1366 |
| | | | | 123/41.1 |
| 2005/0056413 | A1* | 3/2005 | Homan | B60H 1/00921 |
| | | | | 165/203 |
| 2010/0186685 | A1* | 7/2010 | Hiyama | B60H 1/00492 |
| | | | | 123/41.08 |
| 2014/0103128 | A1* | 4/2014 | Patel | F01P 3/20 |
| | | | | 237/5 |
| 2015/0000327 | A1* | 1/2015 | Kakehashi | F28F 9/02 |
| | | | | 62/434 |
| 2015/0176445 | A1* | 6/2015 | Han | F02D 41/1463 |
| | | | | 123/568.12 |
| 2015/0176472 | A1* | 6/2015 | Hutchins | F01P 7/165 |
| | | | | 701/102 |
| 2016/0138530 | A1* | 5/2016 | Lee | F02M 26/22 |
| | | | | 123/568.12 |
| 2016/0138531 | A1* | 5/2016 | Lee | F02M 26/28 |
| | | | | 123/568.12 |
| 2016/0230708 | A1* | 8/2016 | Yang | F02M 26/28 |
| 2017/0082008 | A1* | 3/2017 | Kim | F02M 26/51 |
| 2017/0138320 | A1* | 5/2017 | Kim | F02M 26/28 |
| 2017/0314484 | A1* | 11/2017 | Park | F01P 3/20 |
| 2017/0314516 | A1* | 11/2017 | Kim | F02B 47/08 |
| 2017/0314517 | A1* | 11/2017 | Kim | F02M 26/04 |
| 2017/0335782 | A1* | 11/2017 | Kim | F02D 41/0007 |
| 2017/0361698 | A1* | 12/2017 | Hussain | F01P 1/06 |
| 2018/0156146 | A1* | 6/2018 | Kim | F02D 41/068 |
| 2018/0245503 | A1* | 8/2018 | Toyama | F01P 7/048 |
| 2018/0252144 | A1* | 9/2018 | Shimatani | F01P 7/16 |
| 2018/0334947 | A1* | 11/2018 | Kim | F01N 3/10 |
| 2019/0128173 | A1* | 5/2019 | Lee | F01P 7/165 |
| 2019/0145359 | A1* | 5/2019 | Quix | F02M 26/17 |
| | | | | 123/568.12 |
| 2020/0040800 | A1* | 2/2020 | Kim | F02M 26/28 |
| 2020/0040801 | A1* | 2/2020 | Lee | F01P 3/02 |
| 2020/0040805 | A1* | 2/2020 | Kim | F02M 26/32 |
| 2020/0040806 | A1* | 2/2020 | Kim | F02M 26/24 |
| 2020/0063640 | A1* | 2/2020 | Lee | F01P 11/16 |
| 2020/0063677 | A1* | 2/2020 | Kim | F02D 21/08 |

* cited by examiner

CONTROL METHOD OF COOLING SYSTEM FOR VEHICLE

CROSS-REFERENCE TO RELATED APPLICATION

This application claims priority to and the benefit of Korean Patent Application No. 10-2018-0089817 filed on Aug. 1, 2018, the entire contents of which are incorporated herein by reference.

BACKGROUND

(a) Field of the Invention

The present invention relates to a method for controlling a cooling system for a vehicle, and more particularly, to a method for controlling a cooling system for a vehicle to improve fuel efficiency of the vehicle and heating efficiency by adjusting coolant flow in a heating mode that heats the interior of the vehicle.

(b) Description of the Related Art

In general, an engine exhausts heat energy while generating torque from combustion of fuel, and a coolant absorbs the heat energy while circulating through the engine, a heater, and a radiator, and emits the absorbed heat energy to the outside. When a coolant temperature of the engine is excessively high, knocking occurs, and thus ignition timing needs to be adjusted to suppress occurrence of knocking, thereby causing deterioration of engine performance. When a lubricant temperature is too high, viscosity becomes low, thereby causing deterioration of lubrication performance.

Further, when a coolant temperature of the engine is excessively low, oil viscosity is increased and thus frictional force is increased, fuel consumption is increased, a temperature of exhaust gas is slowly increased. Accordingly, the time to activate a catalyst is increased and quality of exhaust gas is deteriorated. In addition, time taken for normalizing the heater is increased, thereby causing inconvenience to a driver or an occupant within the vehicle. In particular, since viscosity of engine oil is increased when the engine is started in a cold condition such as a winter season, engine output and efficiency are deteriorated, thereby causing deterioration of fuel efficiency. Further, since incomplete combustion of fuel occurs when a temperature of the combustion chamber is low, exhaust gas may be excessively discharged.

Thus, since a single coolant control valve is applied to control several cooling elements, the temperature of the coolant in a particular portion is maintained to be high and the temperature of the coolant in another portion is maintained to be low. In other words, a technology for controlling each part of the coolant passing through a radiator, a heater core, an exhaust gas recirculation (EGR) cooler, an oil cooler, or a cylinder block using one coolant control valve unit has been researched, and a method for effectively controlling the control valve based on a mode of the vehicle has been researched.

The above information disclosed in this section is merely for enhancement of understanding of the background of the invention and therefore it may contain information that does not form the prior art that is already known in this country to a person of ordinary skill in the art.

SUMMARY

The present invention provides a method for controlling a vehicle cooling system to adjust a coolant flow by adjusting a control valve in a heating mode for heating the interior of the vehicle to thereby optimize heating performance.

According to an exemplary embodiment of the present invention, a method is provided for controlling a vehicle cooling system that includes an engine, an EGR cooler, an oil cooler, a heater, a radiator, and a controller, wherein the engine, the EGR cooler, the oil cooler, the heater, and the radiator are respectively connected via a coolant line and coolant circulates through the engine, the EGR cooler, the oil cooler, the heater, and the radiator by operation of a water pump, and the controller receives the coolant from the engine and adjusts a control valve that is connected with the oil cooler, the heater, and the radiator. In particular, the method may include: sensing driving conditions; and operating the control valve when a warm mode is required to warm up the interior of the vehicle among the sensed driving conditions, wherein the operating of the control valve includes first to third modes that are executed depending on a coolant temperature.

The control valve may include: a first connection line that receives a coolant from the engine and through which a coolant distributed to the oil cooler may flow; a second connection line through which a coolant distributed to the heater may flow; and a third connection line through which a coolant distributed to the radiator may flow. In the first mode, the second connection line may be opened and the first and third connection lines may be closed by operating the control valve. The coolant circulating by operation of the water pump may be adjusted to pass through the engine and the EGR cooler, and the coolant introduced to the control valve from the engine may be circulated to pass through the heater through the second connection line.

In the second mode, the first and second connection lines may be opened and the third connection line may be closed by operating the control valve. The coolant circulating by operation of the water pump may be adjusted to pass through the engine and the EGR cooler, and the coolant introduced into the control valve from the engine may be circulated to pass through the oil cooler and the heater through the first and second connection lines. In the third mode, the first, second, and third connection lines may be opened by operating the control valve. The coolant circulating by operation of the water pump may be adjusted to pass through the engine and the EGR cooler, and the coolant introduced into the control valve from the engine may be circulated to pass through the oil cooler, the heater, and the radiator through the first, second, and third connection lines. In the third mode, a coolant temperature may be cooled to a target temperature to adjust a cooling degree based on a driving area of the engine.

In particular, the first mode, the second mode, and the third mode may be performed sequentially. The first mode may be performed until a temperature of the coolant discharged from the EGR cooler reaches a second predetermined temperature. The second mode may be performed until a temperature of the coolant reaches a third predetermined temperature. The control valve may be operated when an outdoor air temperature is less than a first predetermined temperature and a cooling fan is in a turn-on or turn-off state.

As described above, according to the method for controlling the vehicle cooling system of the exemplary embodiment of the present invention, a coolant flow may be adjusted by operating the control valve in the heating mode for heating the interior of the vehicle such that heating performance may be optimized, and fuel efficiency of the vehicle may be improved by effectively adjusting a coolant temperature.

In addition, heating may be effectively controlled by adjusting an opening degree of the control valve without providing an additional valve in the heater, and accordingly, heating control of the interior of the vehicle may be optimized, thereby enhancing the entire productivity of the vehicle. Further, when an outdoor air temperature is less than a predetermined temperature, a coolant having an increased temperature is unconditionally supplied to the heater such that responsiveness in operation for the interior heating may be improved.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DESCRIPTION OF SYMBOLS

Figure 1:
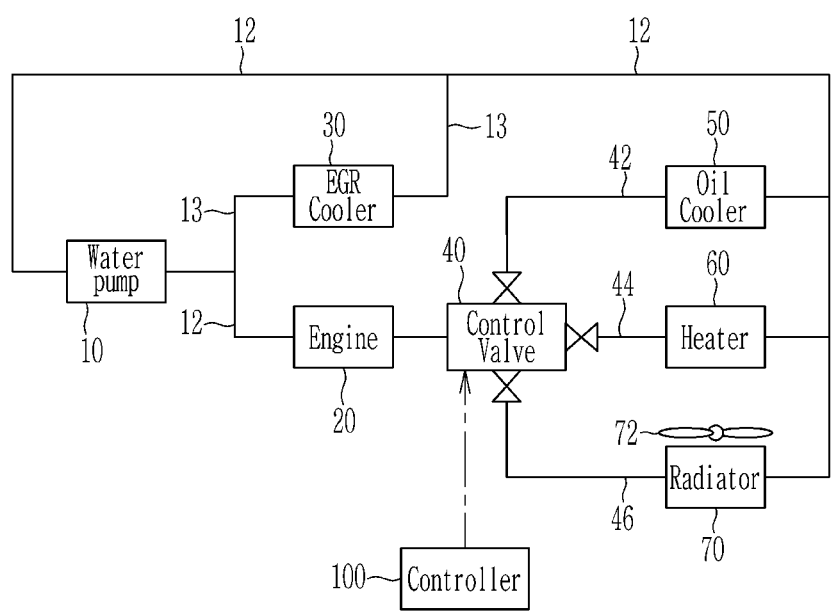
FIG. 1 is a schematic diagram of a cooling system for a vehicle, to which a method for controlling a vehicle cooling system according to an exemplary embodiment of the present invention is applied.

10: water pump
12: coolant line
13: EGR line
20: engine
30: EGR cooler
40: control valve
42, 44, 46: first, second and third connection line
50: oil cooler
60: heater
70: radiator
72: cooling fan

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings. Although exemplary embodiments have been described with reference to a number of illustrative embodiments thereof, it should be understood that numerous other modifications and embodiments may be devised by those skilled in the art that will fall within the spirit and scope of the principles of the present invention.

The drawings and description are to be regarded as illustrative in nature and not restrictive. Like reference numerals designate like elements throughout the specification. Since the size and the thickness of each configuration shown in the drawings are arbitrarily indicated for better understanding and ease of description, the present invention is not limited to shown drawings, and the thickness of layers, films, panels, regions, etc., are exaggerated for clarity.

Referring to FIG. 1, a vehicle cooling system according to an exemplary embodiment of the present invention may include an engine 20, an EGR cooler 30, an oil cooler 50, a heater 60, and a radiator 70. The engine 20, the EGR cooler 30, the oil cooler 50, the heater 60, and the radiator 60 may be respectively connected via a coolant line 12, and a coolant may be circulated therethrough through operation of a water pump 10.

The water pump 10 may be configured to pump a coolant to the engine 20 and the EGR cooler 30 through the coolant line 12. The pumped coolant may be distributed to the engine 20 and the EGR cooler 30. Particularly, the EGR cooler 30 may be connected with the coolant line 12 via an EGR line 13 branched from the coolant line 12 to distribute the coolant discharged from the water pump 10 thereto. The EGR line 13 may be passed through the EGR cooler 30 and then may be connected with the coolant line 12 again.

Accordingly, the coolant pumped through operation of the water pump 10 may be selectively supplied to the engine 20 through the coolant line 12, and may always be supplied to the EGR cooler 30 through the EGR line 13.

The cooling system may further include a control valve 40 disposed at a coolant outlet side of the engine 20 and the control valve 40 may be configured to receive a coolant discharged from the engine 20. The control valve 40 may be configured to operate according to a control signal of a controller 100. The controller 100 may be implemented as at least one microprocessor operated by a predetermined program which may include a series of commands for carrying out a method in accordance with an exemplary embodiment of the present invention.

The control valve 40 may be connected with the oil cooler 50, the heater 60, and the radiator 70 respectively via a first connection line 42, a second connection line 44, and a third connection line 46. A coolant distributed to the oil cooler 50 from the control valve 40 may flow through the first connection line 42. A coolant distributed to the heater 60 from the control valve 40 may flow through the second connection line 44. A coolant distributed to the radiator 70 from the control valve 40 may flow through the third connection line 46. In particular, the radiator 70 may be disposed at a front of the vehicle, and a cooling fan 72 may be provided at a rear side of the radiator 70.

The control valve 40 may be configured to selectively open and close the first, second, and third connection lines 42, 44, and 46, and adjust an opening rate of each of the first, second, and third connection lines 42, 44, and 46 based on a rotation position of a cap (not shown) provided therein. In other words, the control valve 40 may be operated by the controller 100 according to a driving condition of the vehicle and heating or cooling of the interior of the vehicle. Additionally, and coolant discharged from the engine 20 may be circulated by being selectively supplied to the oil cooler 50, the heater 50, and the radiator 70 to thus adjust a coolant temperature.

Figure 2:
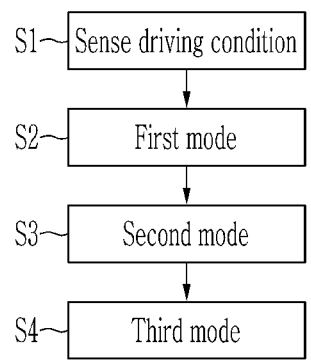
FIG. 2 is a flowchart of the control method of the vehicle cooling system according to the exemplary embodiment of the present invention.
Figure 3:
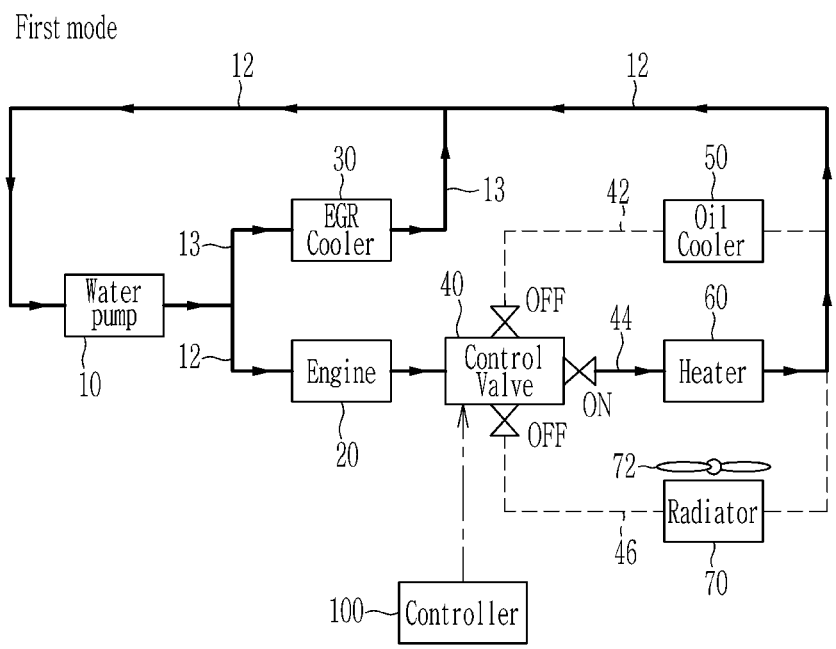
FIG. 3 to FIG. 5 are operation state views of the cooling system depending on each mode in the method for controlling the vehicle cooling system according to the exemplary embodiment of the present invention.
Figure 4:
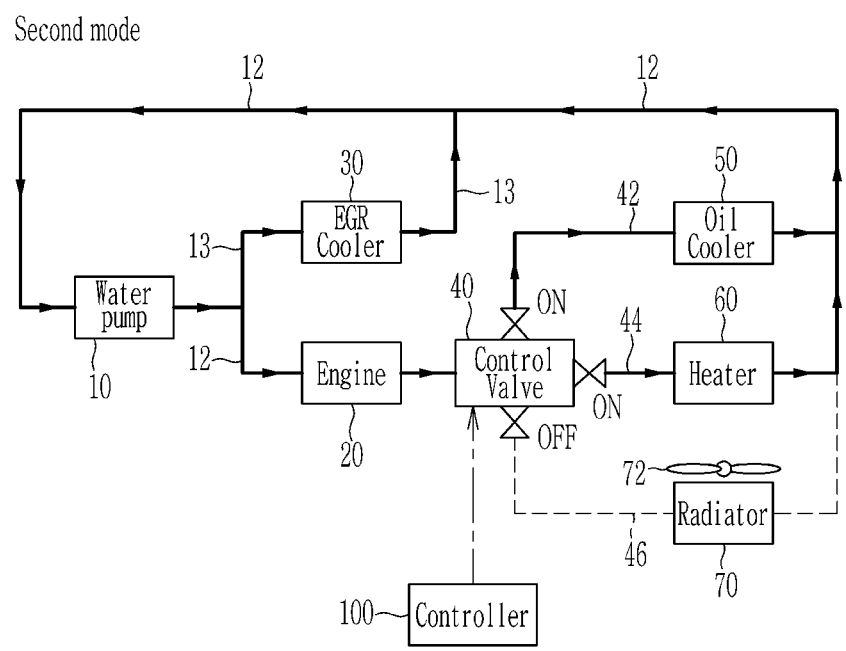
Figure 5:
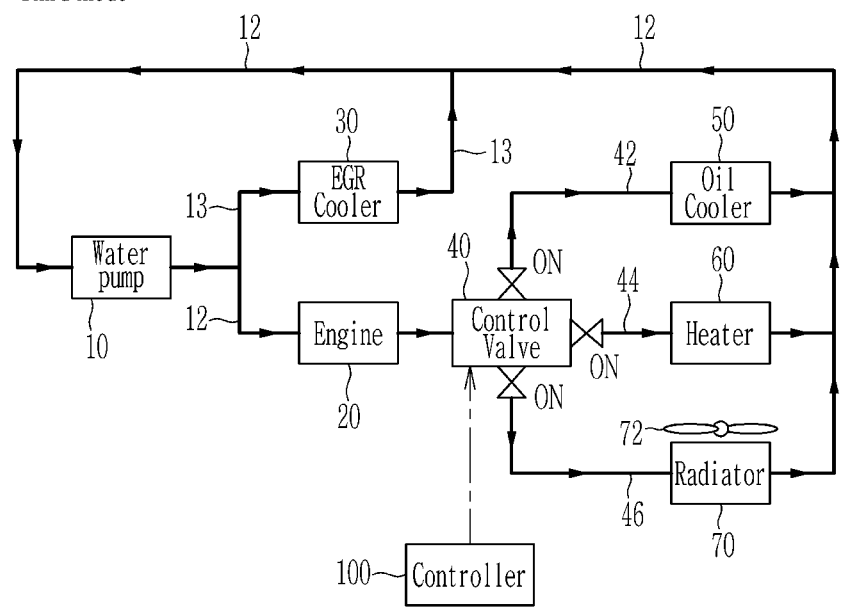

FIG. 2 is a flowchart of a control method of the vehicle cooling system according to the exemplary embodiment of the present invention, and FIG. 3 to FIG. 5 are operation state views of a cooling system of each mode in the control method of the vehicle cooling system according to the exemplary embodiment of the present invention. Referring to FIG. 2, the controller 100 may be configured to sense a vehicle driving condition that includes a temperature of a coolant, a temperature of outdoor air, and the like (S1).

When a fast warm mode of the engine 20 is required according to the sensed driving condition, the controller 100 may be configured to operate the control valve 40. In particular, the control valve 40 may be operated when an outdoor temperature is greater than a first predetermined temperature, and the cooling fan 72 is in a turn-on state or a turn-off state. The first predetermined temperature may be greater than about 15° C. In addition, the control process of the control valve 40 includes first to third modes that are executed according to a coolant temperature.

In the first mode, as shown in FIG. 3, the controller 100 may be configured to open the second connection line 44 and close the first and third connection lines 42 and 46 by operating the control valve 40, and adjust the coolant circulating by operation of the water pump 10 to pass through the engine 20 and the EGR cooler 30. The coolant introduced into the control valve 40 from the engine 20 may pass through the heater 60 through the second connection line 44 and then may circulate along the coolant line 12. In other words, the first mode may be a maximum heating section for optimize heating performance at an area where an outdoor temperature is low by circulating a temperature of the coolant, increased while cooling the engine 20, to the heater 50.

In the second mode, as shown in FIG. 4, the controller 100 may be configured to open the first and second connection lines 42 and 44 and close the third connection line 46 by operating the control valve 40, and adjust the coolant circulating by operation of the water pump 10 to pass through the engine 20 and the EGR cooler 30. In addition, the coolant introduced into the control valve 40 from the engine 20 may pass through the oil cooler 50 and the heater 60 through the first and second connection lines 42 and 44 and then circulate along the coolant line 12. In other words, the second mode is a section that is activated when the oil cooler 50 and the heater 60 are used, and warm-up is performed.

In addition, in the third mode, as shown in FIG. 5, the controller 100 may be configured to open the first, second, and third connection lines 42, 44, and 46 by operating the control valve 40, and adjust the coolant circulating by operation of the water pump 10 to pass through the engine 20 and the EGR cooler 30. In addition, the coolant introduced to the control valve 40 from the engine 20 may pass through the oil cooler 50 and the heater 60 through the first, second, and third connection lines 42, 44, and 46, and then circulate along the coolant line 12. In other words, the third mode is a radiator cooling section, and thus may adjust a target temperature of the coolant by adjusting a cooling amount based on a driving area of the engine 20.

Meanwhile, in the present exemplary embodiment, the first, second, and third connection lines 42, 44, and 46 may be opened or closed in the first to third modes, but this is not restrictive. When the first, second, and third lines 42, 44, and 46 are opened, an opening degree of each of the first, second, and third connection lines 42, 44, and 46 may be adjusted to be a predetermined degree. In other words, a cam for adjusting an opening degree of each of the first, second, and third connection lines 42, 44, and 46 may be provided in the control valve 40, and the opening degree of the connection line may be adjusted according to a rotation position of the cam.

Referring back to FIG. 2, the controller 100 may be configured to sense a driving condition of the vehicle (S1), and then execute the first mode if a heating mode that needs to warm up the interior of the vehicle is required (S2). In the first mode, the coolant may be supplied to the heater 60 through the opened second connection line 44. Thus, the coolant in the coolant line 12 may pass through the engine 20, and pass the EGR cooler 30 through the EGR line 13. The coolant introduced into the control valve 40 from the engine 20 may pass through the heater 60 through the second connection line 44, and then may circulate along the coolant line 12.

Accordingly, the coolant of which a temperature is increased while cooling the engine 20, may pass through the heater 60. In particular, when a heater blower is activated for heating the interior of the vehicle, a high-temperature coolant introduced to the heater 60 increases a temperature of outdoor air through heat exchange with the outdoor air to thus warm up the interior of the vehicle (e.g., increase the interior temperature of the vehicle). The controller 100 may be configured to execute the first mode until a temperature of the coolant discharged from the EGR cooler 30 reaches a second predetermined temperature. The second predetermined temperature may be about 60° C. In other words, when the temperature of the coolant discharged from the EGR cooler 30 becomes about 60° C., the controller 100 may be configured to execute the second mode (S3).

In the second mode, the coolant discharged from the engine 20 may be supplied to the oil cooler 50 and the heater 60 through the opened first and second connection lines 42 and 44. Accordingly, the coolant in the coolant line 12 may pass through the engine 20 and the EGR cooler 30. In addition, the coolant introduced into the control valve 40 from the engine 20 may pass through the oil cooler 50 and the heater 60 through the first and second connection lines 42 and 44, and then circulate along the coolant line 12. The coolant having a temperature of about 60° C. when being discharged to the EGR line 13 from the EGR cooler 30 may continuously warm the oil cooler 50 and the heater 60 while cooling the engine 20.

Particularly, the controller 100 may be configured to continuously execute the second mode until the coolant temperature reaches a third predetermined temperature. The third predetermined temperature may be about 99° C. In other words, when the coolant temperature reaches about 99° C., the controller 100 may be configure to execute a third mode (S4). In the third mode, the coolant discharged from the engine 20 may be supplied to the oil cooler 50, the heater 60, and the radiator 70 through the opened first, second, and third connection lines 42, 44, and 46. Accordingly, the coolant in the coolant line 12 may pass through the engine 20, and pass through the EGR cooler 30 through the EGR line 13. In addition, the coolant introduced to the control valve 40 from the engine 20 may pass through the oil cooler 50, the heater 60, and the radiator 70 through the first, second, and third connection lines 42, 44, and 46, and then circulate along the coolant line 12.

In the present exemplary embodiment, the controller 100 may be configured to open the third connection line 46 connected with the radiator 70 together with the first and second connection lines 42 and 44 when the coolant temperature reaches the third predetermined temperature (i.e., about 99° C.), and accordingly, the coolant temperature may be cooled down (e.g., decreased) to a target temperature by adjusting a cooling amount based on a driving area of the engine 20. In other words, when the interior of the vehicle needs to be warmed (e.g., increased temperature), the controller 100 may be configured to sequentially execute the first mode, the second mode, and the third mode through the above-stated process.

Thus, when the method for controlling the vehicle cooling system of the above-stated exemplary embodiment of the present invention is applied, a coolant flow may be adjusted by operating the control valve 40 in the heating mode for heating the interior of the vehicle to optimize heating performance, and fuel efficiency of the vehicle may be improved by effectively adjusting a coolant temperature. In addition, heating may be effectively controlled by adjusting an opening degree of the control valve 40 without providing an additional valve in the heater, and accordingly, heating control of the interior of the vehicle may be optimized, thereby enhancing the entire productivity of the vehicle. Further, when an outdoor air temperature is less than a predetermined temperature, a coolant having an increased temperature may be unconditionally supplied to the heater to improve responsiveness in operation for the interior heating and satisfaction of consumers.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A method for controlling a vehicle cooling system that includes an engine, an exhaust gas recirculation (EGR) cooler, an oil cooler, a heater, a radiator, and a controller, wherein the engine, the EGR cooler, the oil cooler, the heater, and the radiator are respectively connected through a coolant line and coolant circulates through the engine, the EGR cooler, the oil cooler, the heater, and the radiator by operation of a water pump, and the controller for controlling a control valve that receives the coolant from the engine and is connected to the oil cooler, the heater, and the radiator, respectively, the method comprising:

sensing, by the controller, a plurality of driving conditions; and operating, by the controller, the control valve when a warm mode is required to increase a temperature within the vehicle based on the sensed driving conditions, wherein the control valve is operated based on a first mode, a second mode, and a third mode based on a coolant temperature, and wherein, in the operation of the control valve, the first mode, the second mode, and the third mode are executed sequentially.

2. The method for controlling the vehicle cooling system of claim 1, wherein the control valve includes:

a first connection line that receives a coolant from the engine, and through which a coolant distributed to the oil cooler flows;

a second connection line through which a coolant distributed to the heater flows; and a third connection line through which a coolant distributed to the radiator flows.

3. The method for controlling the vehicle cooling system of claim 2, wherein, in the first mode, the method includes:

opening, by the controller, the second connection line and closing the first and third connection lines by operating the control valve; and operating, by the controller, the water pump to circulate the coolant through the engine and the EGR cooler and to circulate the coolant introduced to the control valve from the engine through the heater through the second connection line.

4. The method for controlling the vehicle cooling system of claim 2, wherein, in the second mode, the method includes:

opening, by the controller, the first and second connection lines and closing the third connection line by operating the control valve; and operating, by the controller, the water pump to circulate the coolant through the engine and the EGR cooler and circulate the coolant introduced into the control valve from the engine through the oil cooler and the heater through the first and second connection lines.

5. The method for controlling the vehicle cooling system of claim 2, wherein, in the third mode, the method includes:

opening, by the controller, the first, second, and third connection lines by operating the control valve; and operating, by the controller, the water pump to circulate the coolant through the engine and the EGR cooler and to circulate the coolant introduced into the control valve from the engine through the oil cooler, the heater, and the radiator through the first, second, and third connection lines.

6. The method for controlling the vehicle cooling system of claim 5, wherein, in the third mode, a coolant temperature is decreased to a target temperature to adjust a cooling degree based on a driving area of the engine.

7. The method for controlling the vehicle cooling system of claim 1, wherein the first mode is executed until a temperature of the coolant discharged from the EGR cooler reaches a second predetermined temperature.

8. The method for controlling the vehicle cooling system of claim 1, wherein the second mode is executed until a temperature of the coolant reaches a third predetermined temperature.

9. The method for controlling the vehicle cooling system of claim 1, wherein the operation of the control valve is performed when an outdoor air temperature is less than a first predetermined temperature and a cooling fan is in a turn-on or turn-off state.

10. A control system for cooling a vehicle, comprising:
an engine;
an exhaust gas recirculation (EGR) cooler;
an oil cooler;
a heater;
a radiator, wherein the engine, the EGR cooler, the oil cooler, the heater, and the radiator are respectively connected through a coolant line;
a water pump, wherein coolant circulates through the engine, the EGR cooler, the oil cooler, the heater, and the radiator by operation of a water pump; and
a controller for controlling a control valve that receives the coolant from the engine is connected to the oil cooler, the heater, and the radiator, respectively,
wherein the controller is configured to:
  sense a plurality of driving conditions; and
  operate the control valve when a warm mode is required to increase a temperature within the vehicle based on the sensed driving conditions, wherein the control valve is operated based on a first mode, a second mode, and a third mode based on a coolant temperature,
wherein the control valve includes:
  a first connection line that receives a coolant from the engine, and through which a coolant distributed to the oil cooler flows;
  a second connection line through which a coolant distributed to the heater flows; and
  a third connection line through which a coolant distributed to the radiator flows, and wherein in the second mode the controller is configured to:
    open the first and second connection lines and close the third connection line by operating the control valve; and
    operate the water pump to circulate the coolant through the engine and the EGR cooler and circulate the coolant introduced into the control valve from the engine through the oil cooler and the heater through the first and second connection lines.

11. The system of claim 10, wherein in the first mode, the controller is configured to:
  open the second connection line and close the first and third connection lines by operating the control valve; and
  operate the water pump to circulate the coolant through the engine and the EGR cooler and to circulate the coolant introduced to the control valve from the engine through the heater through the second connection line.

12. The system of claim 11, wherein in the third mode, the controller is configured to:
  open the first, second, and third connection lines by operating the control valve; and
  operate the water pump to circulate the coolant through the engine and the EGR cooler and to circulate the coolant introduced into the control valve from the engine through the oil cooler, the heater, and the radiator through the first, second, and third connection lines.

13. The system of claim 12, wherein, in the third mode, a coolant temperature is decreased to a target temperature to adjust a cooling degree based on a driving area of the engine.

14. The system of claim 10, wherein the controller is configured to sequentially execute the first mode, the second mode, and the third mode.

15. The system of claim 10, wherein the first mode is executed until a temperature of the coolant discharged from the EGR cooler reaches a second predetermined temperature.

16. The system of claim 10, wherein the second mode is executed until a temperature of the coolant reaches a third predetermined temperature.

17. The system of claim 10, wherein the controller is configured to operate the control valve when an outdoor air temperature is less than a first predetermined temperature and a cooling fan is in a turn-on or turn-off state.

* * * * *